Patented Sept. 7, 1937

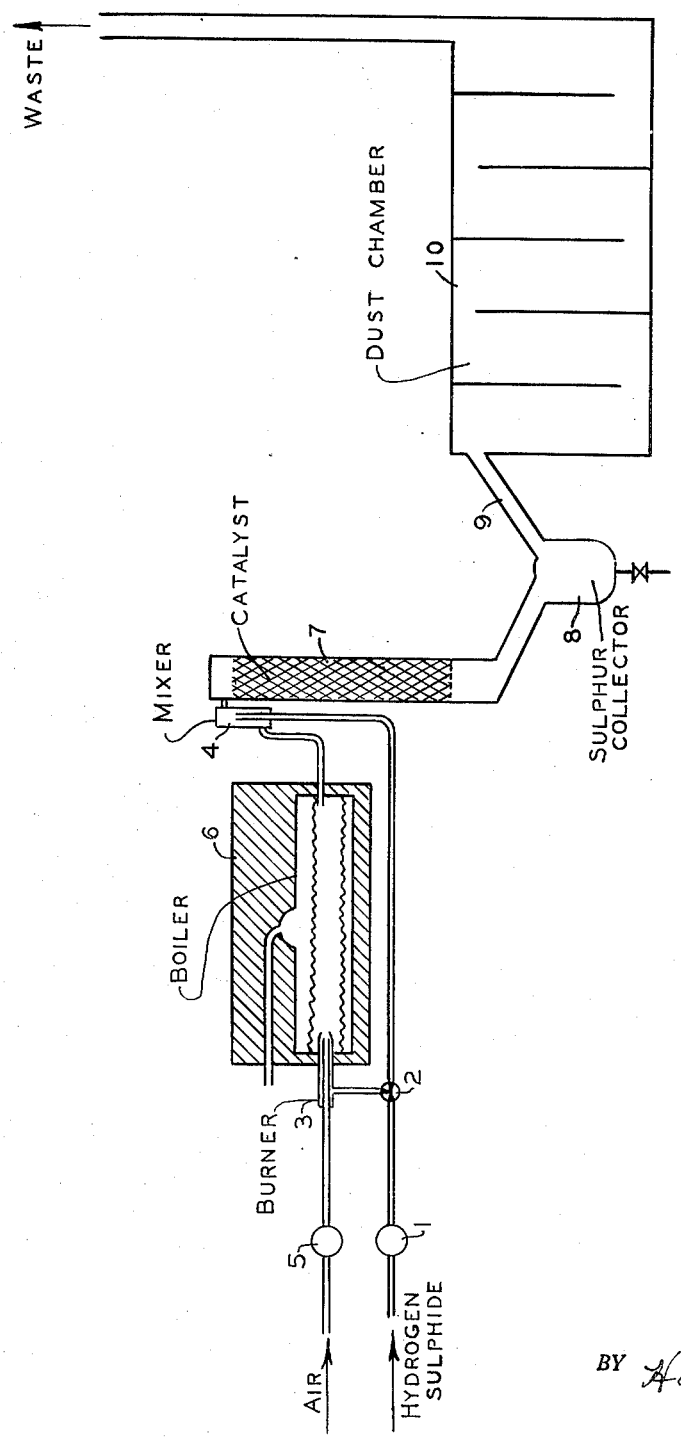

2,092,386

UNITED STATES PATENT OFFICE 2,092,386

PRODUCTION OF SULPHUR

Hans Baehr and Helmut Mengdehl, Ludwigshafen-on-the-Rhine, Germany, assignors to I. G. Farbenindustrie Aktiengesellschaft, Frankfort-on-the-Main, Germany Application December 20, 1933, Serial No. 703,172
In Germany December 22, 1932

6 Claims. (Cl. 23—225)

The present invention relates to the production of sulphur from hydrogen sulphide.

It has already been proposed to produce sulphur from hydrogen sulphide by mixing the hydrogen sulphide with sulphur dioxide in the ratio, by volume, of 2 to 1 and passing the resulting gas mixture through a Claus furnace.

It has also been proposed to produce sulphur from the waste gases from the production of carbon disulphide, which gases contain hydrogen sulphide and carbon oxysulphide in addition to carbon disulphide, by converting the sulphur compounds in a portion of the waste gases into sulphur dioxide by means of a combustion process, mixing the resulting gas containing sulphur dioxide with the remaining portion of the waste gases, and passing the resulting mixture over catalytic materials, such as bauxite, bog iron ore, active carbon or silica gel. In this process, however, the interaction of the carbon disulphide and carbon oxysulphide with the sulphur dioxide by means of the catalytic materials requires the use of temperatures as high as about 600° C., and accordingly the reaction of the hydrogen sulphide with the sulphur dioxide proceeds incompletely.

We have now found that sulphur can be produced from hydrogen sulphide by a kind of incomplete combustion in the presence of catalysts, as for example in a Claus furnace, by a two stage process, wherein a part of the hydrogen sulphide is burned to form sulphur dioxide in the first stage and the resulting sulphur dioxide is reacted with another part of the hydrogen sulphide to form sulphur in the presence of catalysts in the second stage, after the sulphur dioxide has been cooled sufficiently to prevent the temperature in the second stage from exceeding about 400° C. Catalysts suitable for the second stage of the process are for example bauxite, alumina, alumina cement, alumina on which heavy metal oxides have been precipitated or other substances having a large superficial area. The course of the reaction corresponds to the following equations:

I. $2H_2S + 3O_2 = 2SO_2 + 2H_2O$

II. $SO_2 + 2H_2S = 3S + 2H_2O$

The advantage of working in this manner as contrasted with the usual method of working as indicated by the following equation:

III. $2H_2S + O_2 = 2S + 2H_2O$ consists in the fact that the Reaction III which is attended by great evolution of heat is split into two reactions of which that according to Equation I proceeds with evolution of large amounts of heat while the reaction according to Equation II only yields small amounts of heat. The amount of heat produced in the first stage (Reaction I) may be readily utilized, as for example for the production of steam, and thus withdrawn, while the amount of heat produced by Reaction II is sufficiently great to maintain the optimum temperature during the production of sulphur without undesirable increase in temperature taking place. In this manner, a ratio, by volume, of catalyst to hydrogen sulphide to be converted of 1:200 per hour and more may be directly obtained.

The nature of the invention will now be further described with reference to the accompanying drawing which illustrates diagrammatically an arrangement of apparatus suitable for carrying out the process according to this invention but the invention is not restricted to the particular arrangement shown.

Hydrogen sulphide coming from a gas-holder or any other source of supply is forced by a pump 1 through a three-way cock 2 which supplies about one-third of the gas to a burner 3 and about two-thirds to a mixing device 4. An appropriate amount of air is introduced into the burner 3 by a blower 5. The mixture of hydrogen sulphide and air is burned beneath a steam boiler 6 and the resulting gas mixture containing sulphur dioxide which leaves the boiler cooled to from about 200° to about 300° C. is mixed in the mixing vessel 4 with the other part of the hydrogen sulphide and led through a chamber 7 filled, for example, with bauxite. The sulphur thus formed drops into a collecting vessel 8 and is periodically withdrawn therefrom in the usual manner. The waste gas flows through an outlet pipe 9 and through a dust chamber 10 in which the residual sulphur, which is present in vapor form and in the form of hydrogen sulphide and sulphur dioxide, is separated. The desulphurization of the waste gas may also be effected by means of active carbon or other methods instead of dust chambers. Before the waste gas passes from the collecting vessel 8 to the purification treatment, as for example to the dust chambers, it may be led through a second catalytic chamber, a practically quantitative recovery of the sulphur contained in the gas being thus effected.

The arrangement described is especially advantageous because the optimum temperature of the catalyst may be readily maintained with varying loads on the catalytic chamber. Thus, for example, when working up small amounts of hydrogen sulphide, less hydrogen sulphide may be supplied to the burner 3 by adjusting the cock 2, whereby a greater part of hydrogen sulphide is automatically supplied directly to the mixing device 4. Thus the gas mixture leaving the combustion chamber contains an excess of oxygen so that in the chamber 7 a more or less large amount of sulphur is produced according to the Equation III, depending on the adjustment of the cock, whereby the desired increase in temperature in the chamber 7 is obtained. Naturally, care should always be taken that the amount of oxygen introduced is in the correct proportion to the total amount of hydrogen sulphide employed, as called for by the Equation III.

What we claim is:

1. The process of producing sulphur which comprises reacting a gas comprising at least a preponderating amount of hydrogen sulphide with a substantial amount of a gas comprising free oxygen, cooling the resulting gas mixture, mixing it with a further amount of a gas comprising at least a preponderating amount of hydrogen sulphide, and contacting the resulting mixture with a catalyst promoting the interaction of hydrogen sulphide with sulphur dioxide, said cooling being sufficient to prevent the temperature of said mixture when contacted with said catalyst, from rising above about 400° C., the total amount of said gas comprising at least a preponderating amount of hydrogen sulphide and of said gas comprising free oxygen being such that there is about one molecular proportion of oxygen for each 2 molecular proportions of hydrogen sulphide.

2. The process of producing sulphur which comprises reacting one volume of a gas comprising at least a preponderating amount of hydrogen sulphide with a substantial amount of a gas comprising free oxygen, cooling the resulting gas mixture, mixing it with about 2 additional volumes of said gas comprising at least a preponderating amount of hydrogen sulphide, and contacting the resulting mixture with a catalyst promoting the interaction of hydrogen sulphide with sulphur dioxide, said cooling being sufficient to prevent the temperature of said mixture when contacted with said catalyst, from rising above about 400° C., the total amount of said gas comprising at least a preponderating amount of hydrogen sulphide and of said gas comprising free oxygen being such that there is about one molecular proportion of oxygen for each 2 molecular proportions of hydrogen sulphide.

3. The process of producing sulphur which comprises reacting one volume of a gas comprising at least a preponderating amount of hydrogen sulphide with an amount of a gas comprising free oxygen corresponding to about 3 molecular proportions of oxygen for each 2 molecular proportions of hydrogen sulphide, cooling the resulting gas mixture, mixing it with about 2 additional volumes of said gas comprising at least a preponderating amount of hydrogen sulphide, and contacting the resulting mixture with a catalyst promoting the interaction of hydrogen sulphide with sulphur dioxide, said cooling being sufficient to prevent the temperature of said mixture when contacted with said catalyst, from rising above about 400° C.

4. The process of producing sulphur which comprises reacting a gas comprising at least a preponderating amount of hydrogen sulphide with a substantial amount of a gas comprising free oxygen, cooling the resulting gas mixture to between about 200° and about 300° C., mixing it with a further amount of a gas comprising at least a preponderating amount of hydrogen sulphide, and contacting the resulting mixture with a catalyst promoting the interaction of hydrogen sulphide with sulphur dioxide, the total amount of said gas comprising at least a preponderating amount of hydrogen sulphide and of said gas comprising free oxygen being such that there is about one molecular proportion of oxygen for each 2 molecular proportions of hydrogen sulphide.

5. The process of producing sulphur which comprises reacting one volume of a gas comprising at least a preponderating amount of hydrogen sulphide with a substantial amount of a gas comprising free oxygen, cooling the resulting gas mixture to between about 200° and about 300° C., mixing it with about 2 additional volumes of said gas comprising at least a preponderating amount of hydrogen sulphide, and contacting the resulting mixture with a catalyst promoting the interaction of hydrogen sulphide with sulphur dioxide, the total amount of said gas comprising at least a preponderating amount of hydrogen sulphide and of said gas comprising free oxygen being such that there is about one molecular proportion of oxygen for each 2 molecular proportions of hydrogen sulphide.

6. The process of producing sulphur which comprises reacting one volume of a gas comprising at least a preponderating amount of hydrogen sulphide with an amount of a gas comprising free oxygen corresponding to about 3 molecular proportions of oxygen for each 2 molecular proportions of hydrogen sulphide, cooling the resulting gas mixture to between about 200° and about 300° C., mixing it with about 2 additional volumes of said gas comprising at least a preponderating amount of hydrogen sulphide, and contacting the resulting mixture with a catalyst promoting the interaction of hydrogen sulphide with sulphur dioxide.

HANS BAEHR.
HELMUT MENGDEHL.